April 10, 1962 G. B. CHURCHILL 3,029,043
FREE FLOATING WING STRUCTURE AND CONTROL
SYSTEM FOR CONVERTIBLE AIRCRAFT
Filed Jan. 27, 1958
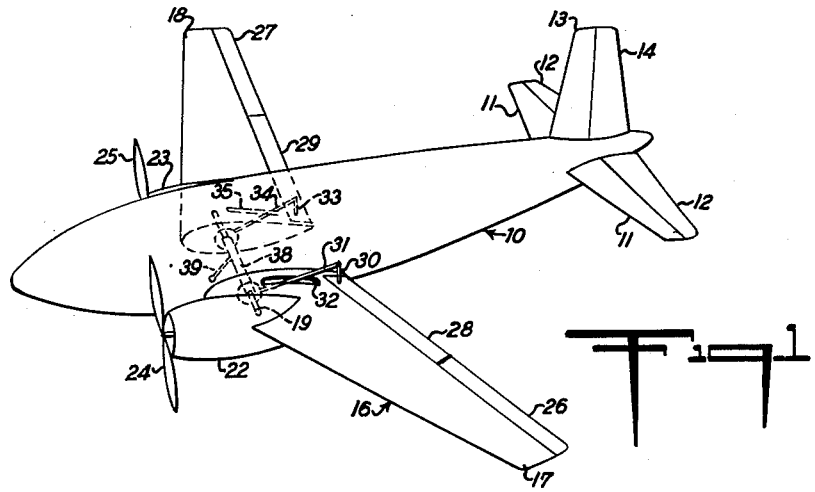
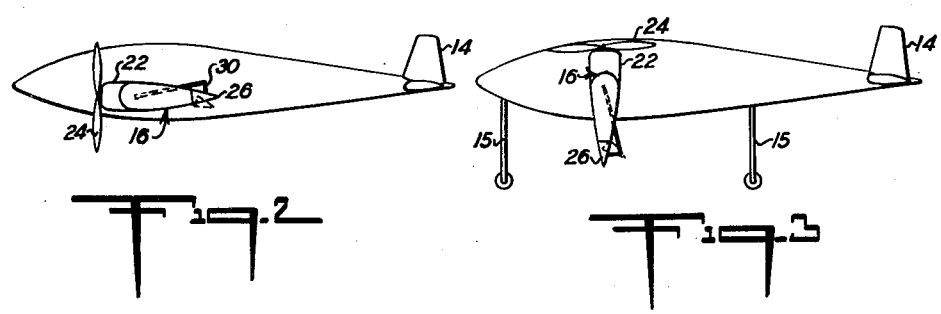
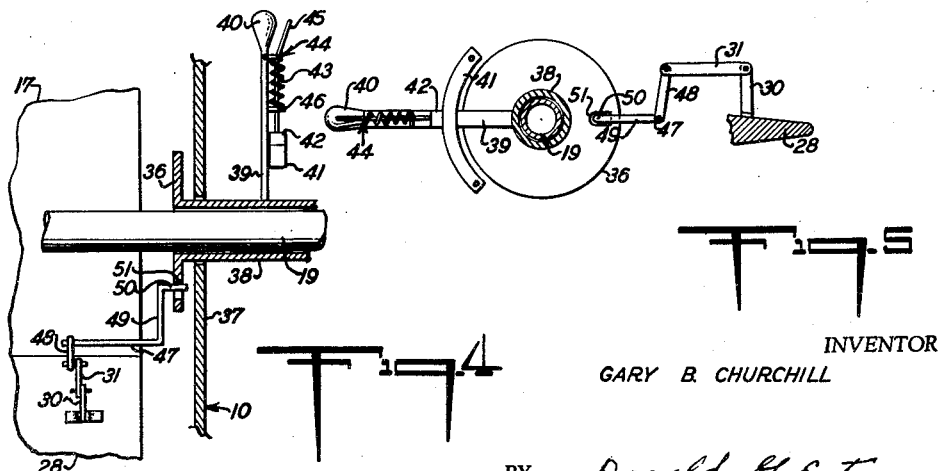
INVENTOR
GARY B. CHURCHILL
BY Donald G. Eaton
AGENT

United States Patent Office 3,029,043
Patented Apr. 10, 1962

3,029,043
FREE FLOATING WING STRUCTURE AND CONTROL SYSTEM FOR CONVERTIBLE AIRCRAFT
Gary B. Churchill, 469 Fox Hill Road, Hampton, Va., assignor of ten percent to Robert D. Lindeman, Hampton, Va., and fifteen percent to John R. Churchill, New Kensington, Va.
Filed Jan. 27, 1958, Ser. No. 711,500
10 Claims. (Cl. 244—7)

This invention relates to aeronautics and more particularly to a control system for a free floating wing primarily for use in convertible aircraft which provides for vertical takeoff and landing and for transition from vertical to horizontal or level flight while maintaining the fuselage in substantially horizontal position.

As is well known, aircraft capable of taking off and landing vertically have many advantages, particularly for military use where only relatively short landing strips or runways are frequently available, but this type of aircraft also has numerous advantages for commercial use. While the conventional helicopter is perfectly suitable for vertical takeoffs and landings and is extremely useful for certain types of operations, nevertheless, this type of aircraft is inherently relatively slow in horizontal or level flight and consequently an aircraft which is capable of vertical takeoffs and landings, as well as relatively high speed level flight would provide a significant step forward in the art.

Numerous types of aircraft capable of vertical takeoff and landing, as well as relatively high speed level flight have been proposed and some of these move the fuselage from a vertical to a horizontal position for transition from vertical to level flight while others maintain the fuselage in a horizontal position at all times. Obviously, it would be preferable to maintain the fuselage of the aircraft horizontal at all times, but it has proven difficult to control the aircraft in such a manner as to maintain adequate control of the aircraft during transition from vertical to level flight and vice versa.

It is accordingly an object of the present invention to provide a control system for a free floating wing on convertible aircraft which provides for vertical takeoffs and landings, as well as relatively high speed level flight while maintaining the fuselage of the aircraft in a substantially horizontal position at all times and while maintaining continuous and adequate control of the aircraft during transition from vertical to level flight and vice versa.

A further object of the invention is the provision of a control system for a free floating wing on convertible aircraft in which the wing is mounted for free pivotal movement on the fuselage of the aircraft and in which the angular position of the wing, as well as the motors and propellers carried thereby relative to the fuselage is controlled by pivotally mounted flaps on the wing and disposed in the slip stream from the propellers.

A still further object of the invention is the provision of a control system for a free floating wing on convertible aircraft in which the angular position of the wing and motors and propellers carried thereby relative to the fuselage is manually controlled solely by the operation of flaps on the wing disposed in the slip stream from the propellers.

Another object of the invention is the provision of a control system for a free floating wing on convertible aircraft in which the position of the wing during transition from vertical to level flight and vice versa is continuously subject to control by the pilot of the aircraft.

A further object of the invention is the provision of a control system for a free floating wing on convertible aircraft which provides for vertical takeoffs and landings and for level flight at a speed comparable to that of conventional aircraft of comparable size and power plant.

A still further object of the invention is the provision of a control system for a free floating wing on convertible aircraft in which the angular position of the wing relative to the fuselage is controlled solely by movement of a flap disposed in the slipstream of the propellers.

Another object of the invention is the provision of a control system for a free floating wing on convertible aircraft in which the angular position of the wing and motors and propellers carried thereby relative to the fuselage is controlled solely by the operation of flaps on the wing, the operation of the flaps being controlled either manually or in response to angular movement of the fuselage with respect to the wing or angular movement of the wing with respect to the fuselage.

A further object of the invention is the provision of a control system for a free floating wing on convertible aircraft in which the pilot, in the event of overload, may adjust the angle of attack of the wing for maximum lift and takeoff as a conventional aircraft.

A still further object of the invention is the provision of a method for controlling the angular position of a wing with respect to the fuselage on convertible aircraft in which the wing is mounted on the fuselage for free rotation about an axis substantially coinciding with the center of lift of the wing, such method including manual and automatic control of wing position solely by controlling aerodynamic forces exerted on the wing structure, automatic control occurring in response to angular movement of the wing or fuselage with respect to the other.

Further objects and advantages of the invention will be apparent from the following description taken in conjunction with the accompanying drawing wherein—

FIG. 1 is a view in perspective showing a convertible aircraft constructed in accordance with this invention and including a free floating wing as well as a control system controlling the position of such wing;

FIG. 2, a side elevational view showing an aircraft constructed in accordance with this invention in level flight and showing in dotted lines the position of the control flap for moving the wing from vertical to horizontal position;

FIG. 3, a side elevational view showing the aircraft of this invention at rest upon the ground and with the wing and power plant disposed in position for vertical takeoff or landing and showing in dotted lines the position of the flap for moving the wing to such position;

FIG. 4, a diagrammatic view with certain parts in section and showing one form of a control system for the flaps; and FIG. 5, a diagrammatic side elevational view showing the control system with certain parts in section and with the sidewall of the fuselage omitted for greater clarity.

With continued reference to the drawing there is shown an aircraft constructed in accordance with this invention and which may well include a fuselage 10 having conventional tail surfaces 11, elevators 12, a tail fin 13 and a rudder 14. The aircraft may also be provided with suitable landing gear 15 shown diagrammatically in FIG. 3.

A wing 16 of substantially conventional airfoil cross section is divided in the center to provide port and starboard wing sections 17 and 18 respectively. A rotatably mounted shaft 19, preferably hollow, extends transversely of the fuselage 10 and is rotatably mounted therein and the outer ends of shaft 19 extend into the root portions of the wing sections 17 and 18 respectively and are secured thereto to pivotally mount said wing sections on the fuselage for free floating pivotal movement as a unit about an axis substantially coinciding with the center of lift of the wing sections to provide a substantially balanced structure.

Mounted on the leading edges of port and starboard wing sections 17 and 18 are motors 22 and 23 or other suitable power plants and propellers 24 and 25 are driven by the motors 22 and 23 to provide motive power for the aircraft. While two motors 22 and 23 have been shown, it is to be understood that this is for illustrative purposes only and that any desired number of motors and propellers may be provided, depending upon the size of the aircraft and the power requirements. It is to be particularly noted, that the motors 22 and 23 are carried solely by the wing sections 17 and 18 and consequently, such motors 22 and 23 as well as the propellers 24 and 25 move with the winding sections 17 and 18 during pivotal movement thereof about a transverse axis substantially at right angles to the longitudinal axis of the fuselage 10 of the aircraft.

Conventional ailerons 26 and 27 may be provided on the trailing edges of the wing sections 17 and 18 for conventional control of the aircraft and inwardly of the ailerons 26 and 27 there may be provided control flaps 28 and 29 pivotally mounted on the trailing edges of the wing sections 17 and 18 respectively and disposed in the slipstreams from the propellers 24 and 25. An arm 30 may be fixed to the flap 28 and link 31 may be pivotally connected to the arm 30 and the link 31 may pass through an opening 32 in the upper surface of the wing section 17 and be connected to a control system in a manner to be presently described. In a similar manner, an upstanding arm 33 may be secured to the flap 29 on the wing section 18 and pivotally connected to the arm 33 is a link 34 extending through an opening 35 in the upper surface of wing section 18 and link 34 may be connected by a control system in a manner to be presently described.

With particular reference to FIGS. 4 and 5, there is shown diagrammatically one form of control system which may be utilized to move the flaps 28 and 29 and since, such control system is duplicated on each side of the aircraft for operating the flaps 28 and 29, the same will be described only in connection with the system for operating the flap 28, it being understood that a similar system is provided on the opposite side for operating the flap 29. As shown in FIGS. 4 and 5, a disk 36 is disposed between the sidewall 37 of the fuselage 10 of the aircraft and the inner end of the wing section 17 and the disk 36 is provided with a sleeve 38 which extends through the sidewall 37 and is rotatably mounted therein. A control lever 39 having a hand engaging knob 40 may be fixed to the sleeve 38 in any desired manner, or may be connected thereto through a suitable linkage system. For simplicity, the lever 39 is shown and described as mounted directly on the sleeve 38. A segment or quadrant 41 may be fixed to the fuselage of the aircraft in any desired manner and the control lever 39 may be locked in any desired position by a shoe or pawl 42 engaging the segment or quadrant 41. In order to disengage the shoe 42 from the segment 41 to permit rotation of the disk 36, there may be provided a rod 43 connected to a bell crank lever 44 pivotally mounted on the control lever 39 with a hand engaging portion 45 of the bell crank lever 44 being disposed adjacent the hand engaging knob 40 in such a manner that gripping of the knob 40 and squeezing of the hand engaging portion 45 of the bell crank lever 44 will operate to move the shoe 42 away from the surface of segment 41 and against the action of compression spring 46. Release of the bell crank lever 44 will result in the spring 46 moving the shoe 42 into engagement with the segment 41 in such a manner as to prevent movement of the disk 36 with respect to the fuselage 10 for a purpose to be later described.

Rotatably mounted in the wing section 17 is a shaft 47 having an arm 48 fixed thereto and the link 31 extending from the arm 30 on the flap 28 is pivotally connected to the arm 48 on the shaft 47. The shaft 47 is provided at the inner end thereof with a crank arm 49 having a laterally extending stud 50 which is rotatably received in a slot 51 in the disk 36.

In the operation of this control system to move the flap 28, it will be seen that movement of the control lever 39 will result in rotating the disk 36 which in turn, through the stud 50, crank arm 49, shaft 47, arm 48, link 31 and arm 30 will pivotally move the flap 28 about the mounting thereof on the wing section 17. As was stated above, this control system is duplicated on the opposite side of the aircraft and consequently, operation of the control lever 39 will result in moving both the flaps 28 and 29 in synchronism, with relation to the upper and lower surfaces of the wing sections 17 and 18 in order to control the movement of such wing sections about the shaft 19. It will also be seen, that with the shoe 42 engaging the segment 41, that movement of the fuselage 10 with relation to the wing sections 17 and 18 will also result in pivotally moving the flaps 28 and 29 in one direction or the other depending upon the direction of such relative movement. This results in providing an automatic control of the operation of the flaps 28 and 29 in addition to the manual control provided by moving the control lever 39 with respect to the fuselage 10.

While one type of manual control system for operating the flaps 28 and 29 has been shown and described, it is to be understood, that this is for illustrative purposes only and that any other type of manual or power operated control system incorporating servo motors or other mechanisms may be employed and this, of course, will in no way affect the operation of the free floating wing or the control system for controlling the position of such wing structure. If desired, there may also be provided a means, not shown, for locking the wing sections 17 and 18 in the horizontal position shown in FIGS. 1 and 2, or in the vertical position as shown in FIG. 3.

In operation and with the motors 22 and 23 as well as the propellers 24 and 25 operating, the flaps 28 and 29 may be moved by operation of the control lever 39 to the dotted line position shown in FIG. 3 whereupon the slipstreams from the propellers 24 and 25 will impinge upon the normal upper surfaces of the flaps 28 and 29 to move the wing sections 17 and 18 to a vertical position as shown in FIG. 3. Upon the application of additional power to the propellers 24 and 25 by the motors 22 and 23, the aircraft will takeoff vertically with the wing sections 17 and 18 maintained in proper position by control of the flaps 28 and 29 and the fuselage 10 will remain in a substantially horizontal position during such vertical takeoff. Upon reaching the desired altitude, the pilot by operation of the control lever 39 may move the control flaps 28 and 29 to the dotted line position shown in FIG. 2 which will result in the slipstreams from the propellers 24 and 25 impinging on the normal lower surfaces of the flaps 28 and 29 thereby moving the wing sections 17 and 18 to a substantially horizontal position as shown in FIG. 2. While the movement of the wing sections 17 and 18 from vertical to horizontal position during transition from vertical to level flight is normally under control of the pilot, nevertheless, in the event the wing sections 17 and 18 tend to suddenly move in one direction or the other and where such movement is more sudden than would normally be sensed and compensated for by the pilot, since it is to be assumed that his hand is grasping the control lever 39, this sudden movement will result in relative movement between the fuselage and the wing sections and consequently, since the disk 36 remains fixed with respect to the fuselage, this will automatically operate to move the control flaps 28 and 29 to compensate for such sudden movement. In a similar manner, if for any reason the pilot has released the bell crank lever 44 thereby locking the control lever 39 to the segment 41, any movement of the fuselage with relation to the wing sections 18 and 17 will result in moving the control flaps 28 and 29 to compensate for such relative movement. As will be noted, the transition from vertical to horizontal flight and vice versa is gradual and consequently full control of the aircraft is maintained at all times merely by proper manipulation of the flaps 28 and 29. The operation of the flaps 28 and 29 for transition from level flight to vertical landing is the opposite to that described above and consequently a detailed description of this operation is not considered desirable or necessary.

It will be seen that by the above described invention there has been provided a relatively simple free floating wing which may be utilized in an otherwise substantially conventional aircraft and which will serve to render such aircraft capable of vertical takeoffs and landings as well as relatively high speed level or horizontal flight. Furthermore, the control system of this invention provides for convenient and complete manual control of the free floating wing as well as automatic control thereof in response to relative movement between the fuselage and the wing and such manual or automatic control serves to afford a smooth and safe transition from vertical to level flight and vice versa and it is to be understood that various types of suitable mechanism may be employed for this purpose and it is further to be understood that the invention is not to be considered as limited to the particular structures and mechanisms shown as these have been illustrated and described merely for illustrative purposes and in order to show and describe one operative embodiment of the invention.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. In an aircraft having a fuselage, a wing divided in the center to provide port and starboard sections having substantially conventional airfoil cross sections, a rotatable hollow shaft extending transversely of said fuselage and secured to said wing sections for pivotally mounting said wing sections on said fuselage for free floating pivotal movement as a unit about an axis substantially coinciding with the center of lift of each wing section to provide a substantially balanced wing structure, a motor and propeller mounted on the leading edge of each wing section, a flap pivotally mounted on the trailing edge of each wing section and control means for simultaneous operation of said flaps, said control means comprising a sleeve rotatably mounted on said shaft, a disk fixed to said sleeve exteriorly of said fuselage on each side, each disk having an aperture therein disposed outwardly of the axis, a control lever fixed to said sleeve, a segment fixed to said fuselage adjacent said lever, means to releasably lock said lever to said segment, a second shaft rotatably mounted in each wing section, a crank on each of said second shafts, a stud on each crank received in the aperture in each disk, an arm on each last named shaft and a link connecting each arm with each flap for manually or automatically moving said flaps in either direction with respect to the normal upper and lower surfaces of said wing sections upon operation of said control lever or upon movement of said fuselage with respect to said wing sections, whereby with said motors and propellers running and upon movement of said flaps toward the normal upper surfaces of said wing sections the slipstream from said propellers will impinge on said flaps and move said wing sections, motors and propellers into vertical position for vertical takeoff of said aircraft and upon reaching the desired altitude and upon movement of said flaps toward the normal lower surfaces of said wing sections, the slipstream from said propellers will impinge on said flaps to move said wing sections, motors and propellers into horizontal position for transition from vertical to horizontal flight.

2. In an aircraft having a fuselage, a wing divided in the center to provide port and starboard sections having substantially conventional airfoil cross sections, a rotatable hollow shaft extending transversely of said fuselage and secured to said wing sections for pivotally mounting said wing sections on said fuselage for free floating pivotal movement as a unit about an axis substantially coinciding with the center of lift of each wing section to provide a substantially balanced wing structure, a motor and propeller mounted on the leading edge of each wing section, a flap pivotally mounted on the trailing edge of each wing section and combined manual and automatic control means for simultaneous operation of said flaps, said control means comprising a control lever and linkage system mounted on said fuselage and connected to said flaps and wings for manually moving said flaps in either direction with respect to the normal upper and lower surfaces of said wing sections upon manual operation of said control system and means to fix said control lever and part of said linkage system against operative control movement with respect to said fuselage and flaps, whereby upon movement of said wing section with respect to said fuselage said flaps will be automatically moved in either direction by automatic operation of another part of said linkage system to automatically compensate for such movement of said wing sections whereby with said motors and propellers running and upon movement of said flaps toward the normal upper surfaces of said wing sections, the slipstream from said propellers will impinge on said flaps to move said wing sections, motors and propellers into vertical position for vertical takeoff of said aircraft and upon reaching the desired altitude and upon movement of said flaps toward the normal lower surfaces of said wing sections, the slipstream from said propellers will impinge on said flaps to move said wing sections, motors and propellers into horizontal position for transition from vertical to horizontal flight.

3. In an aircraft having a fuselage, a wing divided in the center to provide port and starboard sections, a rotatable shaft extending transversely of said fuselage and secured to said wing sections for pivotally mounting said wing sections on said fuselage for free floating pivotal movement as a unit about an axis substantially coinciding with the center of lift of each wing section to provide a substantially balanced wing structure, a motor and propeller mounted on the leading edge of each wing section, a flap pivotally mounted on the trailing edge of each wing section and combined manual and automatic control means for simultaneous operation of said flaps, said control means comprising a control lever and linkage system mounted on said fuselage and connected to said flaps and wings for manually moving said flaps in either direction with respect to the normal upper and lower surfaces of said wing sections upon manual operation of said control system and means to fix said control lever and part of said linkage system against operative control movement with respect to said fuselage and flaps, whereby upon movement of said wing section with respect to said fuselage said flaps will be automatically moved in either direction by automatic operation of another part of said linkage system to automatically compensate for such movement of said wing sections whereby with said motors and propellers running and upon movement of said flaps toward the normal upper surfaces of said wing sections, the slip stream from said propellers will impinge on said flaps to move said wing sections, motors and propellers into vertical position for vertical takeoff of said aircraft and upon reaching the desired altitude and upon movement of said flaps toward the normal lower surfaces of said wing sections, the slipstream from said propellers will impinge on said flaps to move said wing sections, motors and propellers into horizontal position for transition from vertical to horizontal flight.

4. In an aircraft having a fuselage, a wing divided in the center to provide port and starboard sections, a rotatable shaft extending transversely of said fuselage and secured to said wing sections for pivotally mounting said wing sections on said fuselage for free floating pivotal movement as a unit about an axis substantially coinciding with the center of lift of each wing section to provide a substantially balanced wing structure, a motor and propeller mounted on the leading edge of each wing section, a flap pivotally mounted on the trailing edge of each wing section and combined manual and automatic control means mounted on said fuselage and connected to said flaps and wings for simultaneous operation of said flaps in response to manual operation of said control means and means to fix part of said control means against operative control movement with respect to said fuselage and flaps, whereby upon movement of said wing sections with respect to said fuselage said flaps will be automatically moved in either direction by automatic operation of another part of said control means to automatically compensate for such movement of said wing sections whereby with said motors and propellers running and upon movement of said flaps toward the normal upper surfaces of said wing sections, the slipstream from said propellers will impinge on said flaps to move said wing sections, motors and propellers into vertical position for vertical takeoff of said aircraft and upon reaching the desired altitude and upon movement of said flaps toward the normal lower surfaces of said wing sections, the slipstream from said propellers will impinge on said flaps to move said wing sections, motors and propellers into horizontal position for transition from vertical to horizontal flight.

5. In an aircraft having a fuselage, a wing divided in the center to provide port and starboard sections, a rotatable shaft extending transversely of said fuselage and secured to said wing sections for pivotally mounting said wing sections on said fuselage for free floating pivotal movement as a unit about a longitudinal axis of said wing, a motor and propeller mounted on the leading edge of each wing section, a flap pivotally mounted on the trailing edge of each wing section and combined manual and automatic control means mounted on said fuselage and connected to said flaps and wings for simultaneous operation of said flaps in response to manual operation of said control means and means to fix part of said control means against operative control movement with respect to said fuselage and flaps, whereby upon movement of said wing section with respect to said fuselage said flaps will be automatically moved in either direction by automatic operation of another part of said control means to automatically compensate for such movement of said wing sections whereby with said motors and propellers running and upon movement of said flaps toward the normal upper surfaces of said wing sections, the slipstream from said propellers will impinge on said flaps to move said wing sections, motors and propellers into vertical position for vertical takeoff of said aircraft and upon reaching the desired altitude and upon movement of said flaps toward the normal lower surfaces of said wing sections, the slipstream from said propellers will impinge on said flaps to move said wing sections, motors and propellers into horizontal position for transition from vertical to horizontal flight.

6. In an aircraft having a fuselage, a wing divided in the center to provide port and starboard sections, a shaft extending transversely of said fuselage and secured to said wing sections for pivotally mounting said wing sections on said fuselage for free floating pivotal movement as a unit about a longitudinal axis of said wing, a motor and propeller mounted on the leading edge of each wing section, a flap pivotally mounted on the trailing edge of each wing section and combined manual and automatic control means mounted on said fuselage and connected to said flaps and wings for simultaneous operation of said flaps in response to manual operation of said control means and means to fix part of said control means against operative control movement with respect to said fuselage and flaps, whereby upon movement of said wing sections with respect to said fuselage said flaps will be automatically moved in either direction by automatic operation of another part of said control means to automatically compensate for such movement of said wing sections whereby with said motors and propellers running and upon movement of said flaps toward the normal upper surfaces of said wing sections, the slipstream from said propellers will impinge on said flaps to move said wing sections, motors and propellers into vertical position for vertical takeoff of said aircraft and upon reaching the desired altitude and upon movement of said flaps toward the normal lower surfaces of said wing sections, the slipstream from said propellers will impinge on said flaps to move said wing sections, motors and propellers into horizontal position for transition from vertical to horizontal flight.

7. In an aircraft having a fuselage, a wing divided in the center to provide port and starboard sections, means for pivotally mounting said wing sections on said fuselage for free floating pivotal movement as a unit about a longitudinal axis of said wing, a motor and propeller mounted on the leading edge of each wing section, a flap pivotally mounted on the trailing edge of each wing section and combined manual and automatic control means mounted on said fuselage and connected to said flaps and wings for simultaneous operation of said flaps in response to manual operation of said control means and means to fix part of said control means against operative control movement with respect to said fuselage and flaps, whereby upon movement of said wing sections with respect to said fuselage said flaps will be automatically moved in either direction by automatic operation of another part of said control means to automatically compensate for such movement of said wing sections whereby with said motors and propellers running and upon movement of said flaps toward the normal upper surfaces of said wing sections, the slipstream from said propellers will impinge on said flaps to move said wing sections, motors and propellers into vertical position for vertical takeoff of said aircraft and upon reaching the desired altitude and upon movement of said flaps toward the normal lower sections of said wing sections, the slipstream from said propellers will impinge on said flaps to move said wing sections, motors and propellers into horizontal position for transition from vertical to horizontal flight.

8. In an aircraft having a fuselage, a wing divided in the center to provide port and starboard sections, means for pivotally mounting said wing sections on said fuselage for free floating pivotal movement as a unit about a longitudinal axis of said wing, a motor and propeller mounted on the leading edge of each wing section, a flap pivotally mounted on the trailing edge of each wing section and combined manual and automatic control means mounted on said fuselage and connected to said flaps and wings for moving said flaps in response to manual operation of said control means and means to fix part of said control means against operative control movement with respect to said fuselage and flaps, whereby upon movement of said wing with respect to said fuselage said flap will be automatically moved in either direction by automatic operation of another part of said control means to automatically compensate for such movement of said wing sections whereby with said motors and propellers running and upon movement of said flaps toward the normal upper surfaces of said wing sections, the slipstream from said propellers will impinge on said flaps to move said wing sections, motors and propellers into vertical position for vertical takeoff of said aircraft and upon reaching the desired altitude and upon movement of said flaps toward the normal lower surfaces of said wing sections, the slipstream from said propellers will impinge on said flaps to move said wing sections, motors and propellers into horizontal position for transition from vertical to horizontal flight.

9. In an aircraft having a fuselage, a wing, means for pivotally mounting said wing on said fuselage for free floating pivotal movement about a longitudinal axis of said wing, a motor and propeller mounted on the leading edge of said wing, a flap mounted on the trailing edge of said wing and combined manual and automatic control means mounted on said fuselage and connected to said flap and wings for moving said flap in response to manual operation of said control means and means to fix part of said control means against operative control movement with respect to said fuselage and flap, whereby upon movement of said wing with respect to said fuselage said flap will be automatically moved in either direction by automatic operation of another part of said control means to automatically compensate for such movement of said wing whereby with said motor and propeller running and upon movement of said flap toward the normal upper surface of said wing, the slip stream from said propeller will impinge on said flap to move said wing, motor and propeller into vertical position for vertical takeoff of said aircraft and upon reaching the desired altitude and upon movement of said flap toward the normal lower surface of said wing, the slipstream from said propeller will impinge on said flap to move said wing, motor and propeller into horizontal position for transition from vertical to horizontal flight.

10. In an aircraft having a fuselage, a wing, means for pivotally mounting said wing on said fuselage for free floating pivotal movement about a longitudinal axis of said wing, a motor and propeller mounted on said wing, a flap pivotally mounted on said wing in the slipstream from said propeller and combined manual and automatic control means mounted on said fuselage and connected to said flap and wings for moving said flap in response to manual operation of said control means and means to fix part of said control means against operative control movement with respect to said fuselage and flap, whereby upon movement of said wing with respect to said fuselage said flap will be automatically moved in either direction by automatic operation of another part of said control means to automatically compensate for such movement of said wing whereby with said motor and propeller running and upon movement of said flap toward the normal upper surface of said wing, the slipstream from said propeller will impinge on said flap to move said wing, motor and propeller into vertical position for vertical takeoff of said aircraft and upon reaching the desired altitude and upon movement of said flap toward the normal lower surface of said wing, the slipstream from said propeller will impinge on said flap to move said wing, motor and propeller into horizontal position for transition from vertical to horizontal flight.

References Cited in the file of this patent

UNITED STATES PATENTS

| | | |
|---|---|---|
| 2,708,081 | Dobson | May 10, 1955 |
| 2,835,456 | Kaplan | May 20, 1958 |

FOREIGN PATENTS

| | | |
|---|---|---|
| 615,418 | France | Apr. 29, 1926 |
| 793,426 | France | Apr. 16, 1935 |
| 437,447 | Great Britain | Oct. 28, 1935 |